United States Patent

[11] 3,587,997

[72] Inventor Robert E. Wood
Ann Arbor, Mich.
[21] Appl. No. 795,415
[22] Filed Jan. 31, 1969
[45] Patented June 28, 1971
[73] Assignee Sycor Inc.
Ann Arbor, Mich.

[54] REVERSING DRIVE MEANS FOR TAPE REELS AND THE LIKE
11 Claims, 6 Drawing Figs.

[52] U.S. Cl. .......... 242/201, 74/215
[51] Int. Cl. .......... B11b 15/32, G03b 1/04
[50] Field of Search .......... 242/200, 208, 54.1, 67.4, 66; 74/202, 207, 214, 216

[56] References Cited

UNITED STATES PATENTS 2,948,485 8/1960 Cotte .......... 242/201
3,009,663 11/1961 Armstead .......... 242/201
3,171,520 3/1965 Haines .......... 74/214X
3,211,014 10/1965 Sanderson .......... 74/207

*Primary Examiner*—Leonard D. Christian
*Attorney*—Price, Heneveld, Huizenga and Cooper

ABSTRACT: A drive train including a reversible motor having an output shaft coupled to one or the other of a pair of tape drive spindles as a function of the driving direction of the output shaft, by a drive transmission means including an idler roller held in driving engagement with the motor output shaft by a support bracket pivotal about the axis of the output shaft, such that the support bracket follows the driving direction of the shaft to move the idler roller in an arcuate path of constant radius about the output shaft axis as a center, into and out of engagement with one or the other of the two tape drive spindles.

INVENTOR.
ROBERT E. WOOD
BY Price, Heneveld, Huizenga & Cooper
ATTORNEYS

INVENTOR
ROBERT E. WOOD
BY Price, Heneveld, Huizenga & Cooper
ATTORNEYS

REVERSING DRIVE MEANS FOR TAPE REELS AND THE LIKE

BACKGROUND

The present invention relates to a drive train or mechanism particularly adapted for use with tape recorder devices and the like. More particularly, the invention relates to such a drive mechanism in which either of a pair of drive spindles can selectively be driven in one of two mutually opposite directions, in order to wind tape onto a reel or the like on one such spindle from a like member on the other such spindle. More particularly still, the invention relates to tape drives for use in recorder/reproducer mechanisms operating in data entry and electronic data processing equipment, and especially to a drive train for use in adapting cassette-type tape magazines into digital data processing applications.

In my copending application, Ser. No. 792,281, filed Jan. 21, 1969, reference is made to the concept of using the conventional and popular cassette-type tape cartridge in the much more critical environment of electronic data entry and processing equipment. The present invention provides a drive means which is particularly well adapted for such an application of this type of tape magazine.

In conventional cassette tape magazine usage, which until now has been almost entirely in the field of audio recording and reproducing, the magnetic recording tape enclosed within the cassette is driven past the tape head by a capstan and pinch roller arrangement, as is true in most audio tape recorder devices. The drive capstan in such an arrangement enters the interior of the cassette through one of two apertures located in the top and bottom walls of the cassette, immediately behind the path followed by the tape past the tape head, with the pinch roller engaging the tape through another opening in the cassette, formed in the frontal face thereof, on the opposite side of the tape from the position of the capstan. While this drive arrangement is quite satisfactory for audio work, the requirements of electronic data processing are far more demanding, and are not satisfied by the performance of a capstan-and-pinch-roller drive train, which is deficient in speed regulation, drive smoothness, drive reversibility, and many other factors. Consequently, while the tape storage and handling aspects of cassette tape magazines made it appear that usage of the same in data-handling applications was a very desirable approach, an entirely new concept in a drive mechanism was necessary if any such new approach was to be put into practice.

SUMMARY

The present invention provides the answer to the aforementioned requirement for a new concept in drive mechanisms for cassette-type tape recorder machines, thereby making practical the adaptation of cassette magazines into data processing applications.

As is generally known, cassette-type tape magazines have a pair of internal, rotatable spools or reeling means, to each of which is attached one end of the recording tape enclosed within the cassette. The inside diameter of each such spool or reeling means is made accessible from outside the cassette by means of concentric bosslike openings in the cassette walls, and each such spool has a series of inwardly directed, radially extending toothlike elements which serve as centering and engaging members for spindles or shafts, either of which when rotated will take up the tape driven toward its respective spool by the capstan-type driving means. The present invention utilizes these available tape-winding spools inside each cassette as the driving vehicles for the tape itself, by a novel and unique type of drive train which rotates a spool-engaging drive spindle. As may be appreciated, many problems are inherent in accomplishing such a result, and the present invention provides many advantages by effectively resolving such problems.

Briefly stated, the drive mechanism of the present invention comprises a reversible motor means having a bidirectional output shaft, a pair of mutually spaced drive spindles for tape reels and the like, to be driven singly in mutually opposite directions, and a drive transfer or transmission means which effectively couples one or the other of the drive spindles to the motor means output shaft to be driven thereby, the particular spindle so coupled being a function of the driving rotation of the motor means output shaft.

IN THE DRAWINGS

PREFERRED EMBODIMENT

Figure 1:
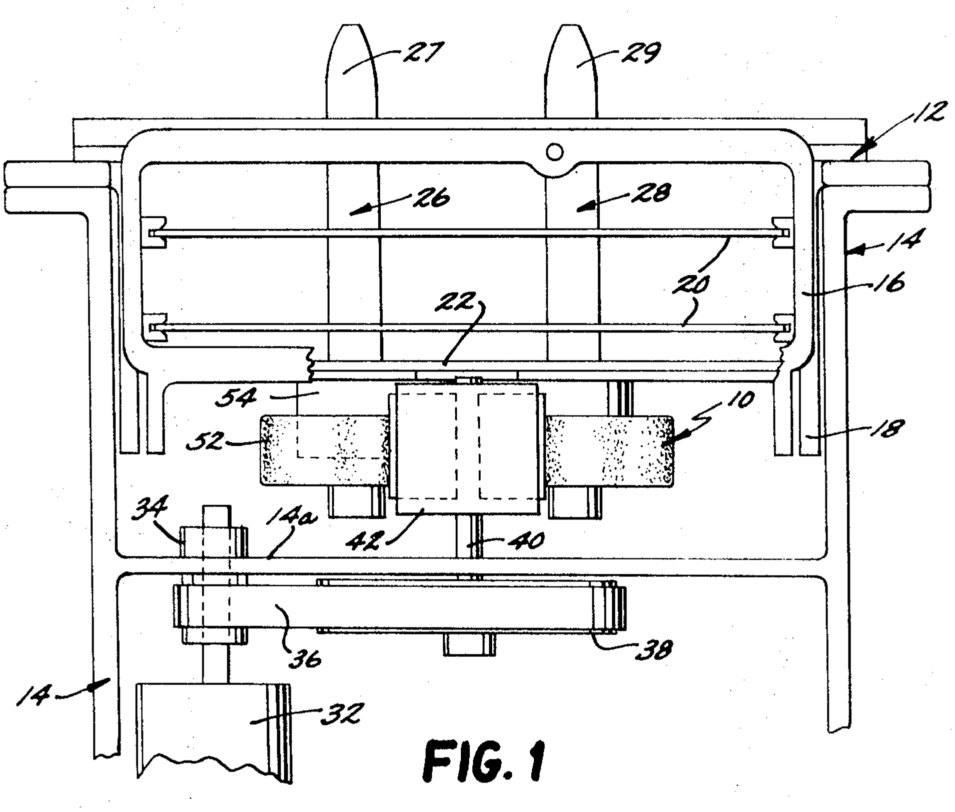
FIG. 1 is a fragmentary front elevation of a tape recorder mechanism embodying the novel drive apparatus.

Referring first to FIG. 1, the drive means 10 of the invention is illustrated in a preferred tape recorder/reproducer apparatus, in particular, one adapted to use cassette-type tape magazines. Such a recorder mechanism may include upper and lower frame portions 12, 14, respectively, which interfit such that the upper portion 12, which may carry the electronic components and circuitry for recording and reproducing functions, may rest upon and be supported by the lower frame portion, which houses and supports the drive motor and its controlling electronics. Such a recorder frame and structural arrangement is illustrated and described in more detail in my copending application Ser. No. 792,281, filed Jan. 21, 1969, directed to tape-sensing and controlling means of an optical nature. As will be recognized, the particular frame configuration and recorder/reproducer apparatus is not critical to the drive means of this invention, which in its broader aspects is readily useable in a multitude of particular apparatus configurations; however, a particularly useable frame and apparatus is shown as environment, for a more complete understanding of the invention. In this environment, the upper frame 12 preferably has a swing-away head arm 16 which is pivotally mounted to lower wall extremities 18 of the upper frame, and upon which the tape head, tape guides, etc. (not specifically shown) are mounted for operation. The upper frame also supports a pair of horizontally disposed circuit boards 20, upon which recording and reproducing function circuitry may be mounted. Beneath the circuit boards and generally parallel thereto is a bottom or base frame wall 22, extending between and secured to the lower wall extremities 18 mentioned previously.

Figure 2:
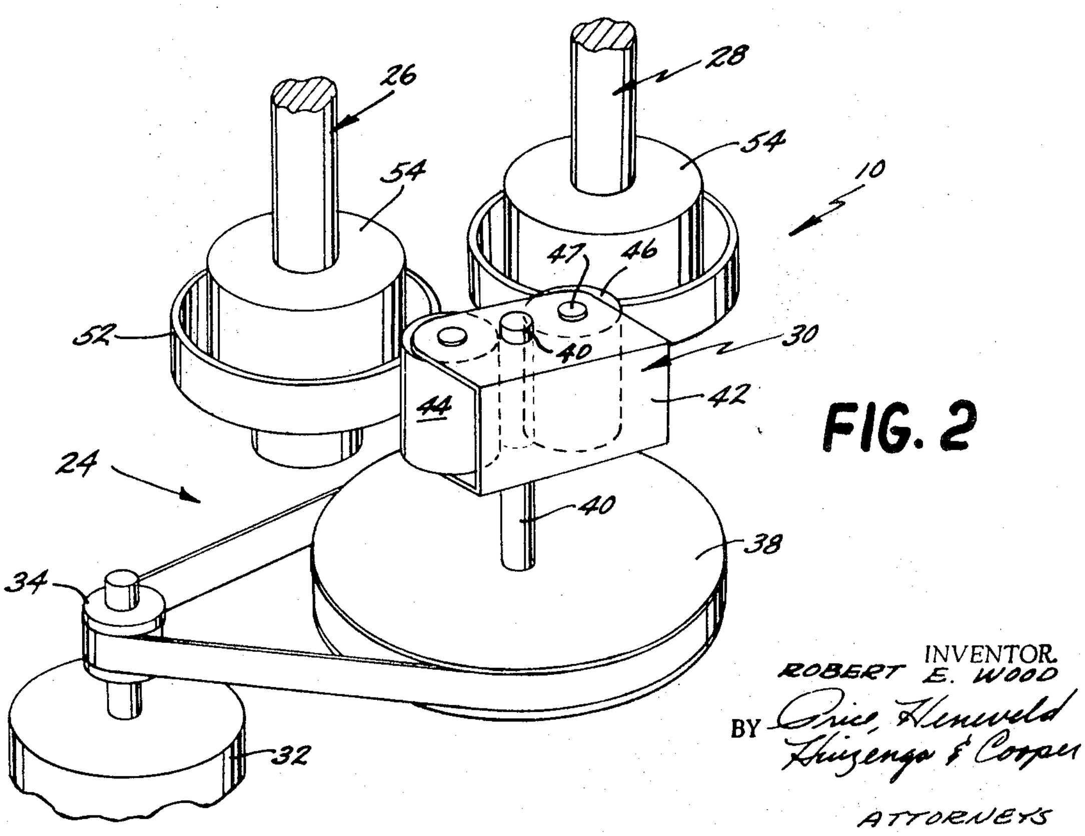
FIG. 2 is an enlarged, fragmentary perspective view of the drive apparatus itself.

With reference to FIGS. 1 and 2, the drive means 10 of the invention includes generally a reversible motor means 24, a pair of drive spindles 26 and 28, and a drive transfer means 30 which in effect couples the motor means to the drive spindles. More specifically, the motor means 24 includes an electric motor 32, preferably mounted to a wall of the lower frame portion 14, whose drive shaft is disposed upwardly, preferably having a pulley or drive bushing 34 at its upward end and being journaled in a transverse wall 14*a* of the lower frame portion. A flat and generally smooth belt 36 couples the motor by its bushing 34 to a drive drum 38 having an upstanding output shaft 40, which is also journaled in the aforementioned transverse wall 14*a* of the lower frame, preferably by means of a low-friction bearing, and preferably in a manner supporting the drum 38 and shaft 40 in the position illustrated in FIG. 1.

Figure 4:
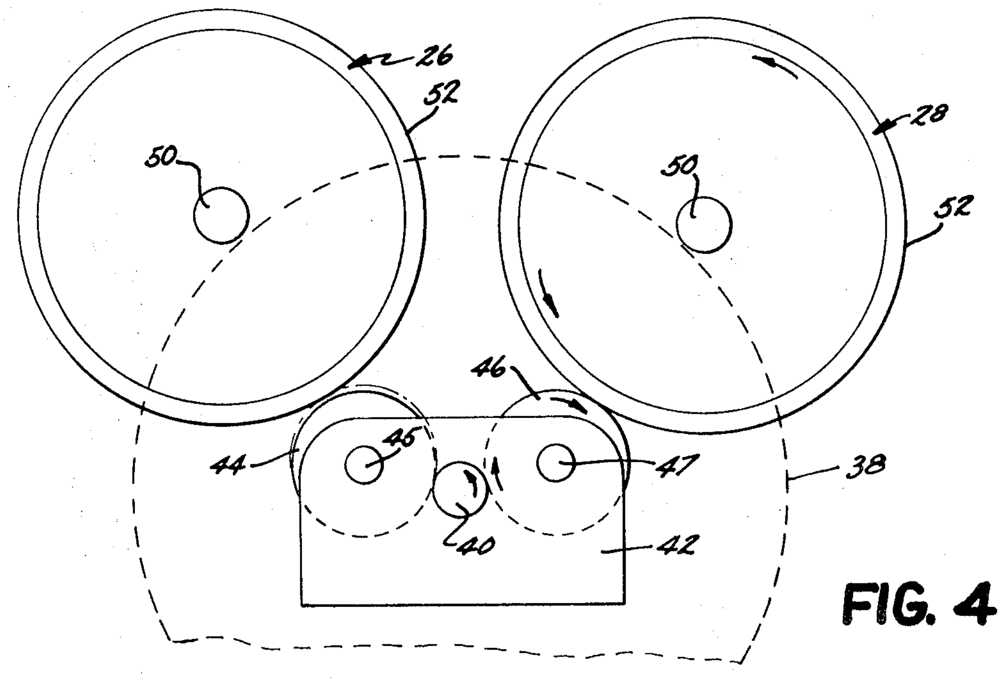
FIG. 4 is an enlarged plan view showing relative drive train component size and positioning.

The drive means output shaft 40 extends upwardly through the spaced, generally parallel flanges or legs of a channel-shaped support bracket 42 forming a part of the drive transfer means. Preferably, low-friction bearings are used between the shaft and the bracket, and the bracket is supported on the shaft at a predetermined level, as illustrated, as for example by an appropriate shoulder on the shaft or other suitable means. Within support bracket 42 are a pair of mutually spaced idler roller elements 44 and 46, also rotatably mounted between the arms of the bracket, as by axial shafts 45 and 47, respectively, journaled in the bracket arms. The axis of rotation of roller elements 44 and 46 is thus parallel to that of motor means output shaft 40, and the roller elements are mounted in rotational engagement with this shaft, in the alignment illustrated in FIG. 4, i.e., with the axis of the two roller elements positioned slightly forwardly of that of the output shaft, with respect to the open front side of the support bracket.

This arrangement is such that each of the rollers 44 and 46 is continuously driven by motor means output shaft 40; as previously indicated, however, the motor means is of a reversible nature, and both the output shaft 40 and the rollers 44 and 46 thus will rotate in either of two possible directions. It is important to the concept of this invention that when the output shaft 40 is driven in one such direction, drive motion is transferred through one of the idler rollers to one of the drive spindles 26 or 28, while the other such spindle not then driven; conversely, when the output shaft 40 is rotated in the opposite direction, reverse drive motion is transferred through the other such idler roller to the other such drive spindle, while the first spindle is not then driven. This is effected by positioning the two drive spindles and the drive transfer means 30 in the relative relationship seen in FIG. 4, from which it will be noted that the axis of each of the idler rollers 44 and 46 lies outside the fixed V-shaped locus on which the axis of drive shaft 40 and the axes of spindles 26 and 28 are all located. Also, it will be noted that in the position illustrated, idler roller 46 is in driving contact with spindle 28, while roller 44 is out of contact with spindle 26; by a slight clockwise rotation of the drive transfer means 30 about the axis of drive shaft 40, however, roller 44 will be brought into contact with spindle 26 at the position indicated in phantom, while roller 44 will be moved out of contact with spindle 28 by a brief clearance. This clearance should be kept as small as possible in order to minimize the time required to effect reversing of the drive, and a clearance on the order of 50 thousandths of an inch is felt to be completely adequate.

Figure 3:
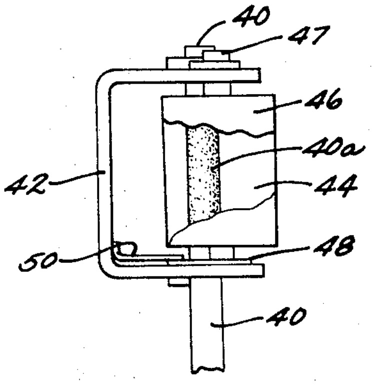
FIG. 3 is a fragmentary side elevation of a part of the drive apparatus.

The aforementioned shifting in position of the drive transfer means 30 is automatically provided for upon reversal of the drive direction of motor means output shaft 40. That is, the support bracket 42 which mounts the two idler rollers must obviously be pivotally mounted on output shaft 40, since the output shaft freely rotates with respect to the support bracket; however, in accordance with the invention a slight drag is introduced between the support bracket and output shaft 40, causing the support bracket to follow the direction of rotation of the output shaft. A number of suitable means may be utilized to introduce this slight drag, including magnetic as well as mechanical or friction means. For purposes of illustration, a simple mechanical friction drag is illustrated in FIG. 3 which will very adequately produce the desired result. This drag comprises simply a friction washer or disc 48 which is secured to output shaft 40 for rotation thereby, and an arm 50 attached to the support bracket 42 and extending toward shaft 40 to contact the upper surface of washer 48. Preferably, a pad of plastic or felt is attached to the end of arm 50 for actual contact with the face of disc 48, and disc 48 may be a wave washer, having surface undulations or irregularities producing the desired drag effect between shaft 40 and bracket 42. This drag may be exceedingly small in magnitude, since it is provided only for the purpose of swinging bracket 42 one way or the other about shaft 40, depending upon the direction or rotation of the latter. Normally, it might be anticipated that the bushing or bearings between output shaft 40 and bracket 42 would produce enough relative friction to introduce the required amount of drag; however, for positive and completely dependable drive actuation, it is felt that the inclusion of an auxiliary drag means is a desirable feature, particularly since the slight amount of drag involved is totally negligible with respect to loading of the motor means.

Figure 6:
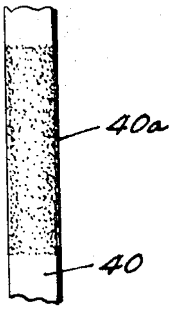
FIG. 6 is an enlarged, fragmentary side elevation of the motor means output shaft.

The idler rollers 44 and 46 are preferably of a hard rubber-like material such as neoprene or polyurethane, and their outer surfaces may be generally smooth. The output shaft 40 of the drive transfer means 30 is preferably a generally rigid and nonresilient shaft which is preferably of metal. The upper portion 40*a* of this shaft (FIG. 6), which engages the outer surfaces of the idler rollers, is preferably roughened, in order to increase friction between this shaft and the idlers. The roughened area 40*a* on this shaft is preferably produced by a shot-peening operation in which an appropriate abrasive media such as glass shot or beads is impacted against the shaft under air pressure. The slightly roughened and superficially cratered surface produced in this manner has been found to significantly increase the driving friction between the resilient idler rollers and the output shaft and, somewhat surprisingly, has also been found to reduce wear between these members over extended periods of use. Similarly advantageous results can also be obtained by a similar shot-peening operation to the outside surface of the drive spindles 26 and 28, in the areas where the idler rollers are brought into driving engagement with these spindles.

Figure 5:
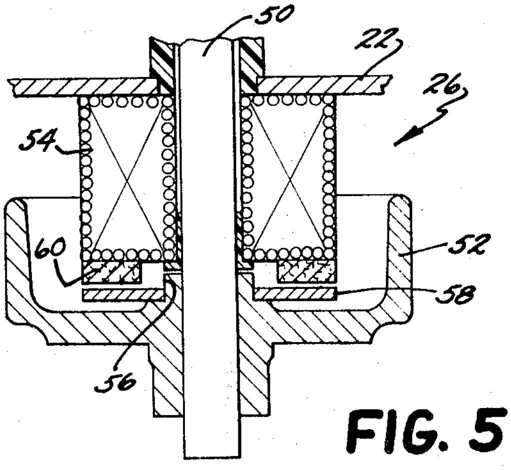
FIG. 5 is an enlarged, fragmentary sectional elevation of one of the drive spindles in the apparatus.

The drive spindles 26 and 28 are identical members, and spindle 26 is shown in detail in FIG. 5 as representative of either such spindle. Basically, each spindle includes a central shaft 50 and a drive drum or hub 52, which is keyed or otherwise nonrotatively secured to the shaft 50, concentrically thereof. As indicated in FIG. 1, it is the outer surface of the drive hub 52 which is roughened in the previously mentioned manner, for increased friction with the resilient idler rollers; more specifically, the drive hubs 52 are preferably of a low-mass or lightweight material such as aluminum, and the outer drive surface thereof is preferably hard anodized after the abrasive blasting process described above. This treatment has been found to provide a very desirable increased-friction drive surface for this member which is itself of great durability, and which also has been found to prolong the useful life of the resilient idler rollers.

As illustrated in FIG. 5, the aforementioned spindle drive drum or hub 52 is a hollow, dished element of U-shaped cross section, in whose recessed rear extremity fits the annular field coil 54 of a magnetic brake. Field coil 54 is attached for support to the underside of the bottom frame wall 22 mentioned hereinabove, and has a central passage through which the shaft 50 of the spindle is freely and rotatably insertable. Centrally disposed of the drive hub 52 is an internal boss 56 which preferably is of square cross section. This boss slidably fits through a squared opening of complementary size formed at the center of a flat brake washer 58, which is of magnetically permeable or paramagnetic material. The operation of the electrically actuated magnetic brake thus described will be readily understood by considering its components; that is, upon energization of the field coil 54, a relatively strong magnetic field is established axially of the spindle, which immediately attracts the brake washer 58, raising it upward into direct contact with a brake member 60 secured to the lower end extremity of the field coil structure. Brake member 60 is a washerlike element made of a friction brake material or lining. Since the brake washer 58 is nonrotatively attached to the drive spindle, braking forces applied to washer 58 are directly transmitted to the hub 52 and to the spindle shaft 50; consequently, when field coil 54 is energized, braker washer 58 is lifted tightly up against brake lining 60, and the spindle is immediately brought to a stop.

The drive train or mechanism disclosed hereinabove will be recognized by those skilled in the art as presenting significant advantages for tape machines, particularly those which utilize the cassette-type magazine. As indicated previously, the tape enclosed within the cassette is driven directly by the spindles 26, 28, which have spindle caps 27, 29, respectively (FIG. 1) mounted atop them for engagement with the internally toothed winding spools present within the conventional cassette. The particular shape of the spindle caps 27, 29 may be a matter of considerable importance, for a wide variety of reasons essentially founded on the fact that the engagement between the spindle caps and the cassette spool teeth directly and immediately affects the smoothness and regularity of the tape movement, and in data processing applications this is a matter of utmost importance. Consequently, while numerous tape drive applications can use the drive mechanism of the present invention to great advantage without special spindle caps, digital or other data-handling applications particularly should utilize spindle caps such as are disposed and claimed in copending application Ser. No. 802,776, filed Feb. 27, 1969, since very definite advantages are to be gained thereby.

As stated previously, the drive mechanism of the present invention is particularly advantageous in data-processing applications, and many aspects of this drive are provided with such an application foremost in mind. For example, the relationship of the rigid motor means output shaft 40 to the somewhat resilient idler rollers 44, 46, and of the latter to the rigid drive hubs of the spindles 26 and 28, with the driving surfaces of the rigid members having the roughened surface characteristics noted previously, materially increases drive reliability and reduces speed irregularity. Further, the system as a whole is an extremely responsive, low-inertia drive which can be started and stopped, as well as reversed, almost instantaneously. In this connection, it is to be noted that the presence of essentially duplicate idler rollers, as opposed to a single such roller which would swing over a wider arcuate path to contact one or the other of the drive spindle hubs, is essentially a matter of optimizing performance. That is, a single idler roller mounted immediately forward of the motor means output shaft, generally between the drive spindle hubs, will operate satisfactorily from a general or overall point of view, in that a single such idler will swing from one to the other of the drive spindles as the motor means output shaft changes its direction of rotation and the support bracket follows the driving direction of the motor output; however, the time interval required for moving the single such idler from one spindle to the other is much larger than is true of the preferred embodiment illustrated and described hereinabove, which is required to move only a few thousandths of an inch in order to disengage one drive spindle and engage the other.

In connection with the smoothness of the drive and the relatively strict conditions applicable in data processing applications, the use in the present device of the belt-type drive between the shaft of the motor itself and the drive drum 38 is also an important factor, including the use of the flat and smooth belt illustrated in the drawings. That is, while the drive must be positive in operation and performance under all conditions and slippage must be strictly avoided, gear trains and the like have been found to introduce very undesirable drive pulsations which will distort the recording and reproduction of binary-type data beyond all acceptability. The same is basically true of belt drives which incorporate toothed or cleated belts, whether of integrally molded construction or otherwise. Indeed, it has been discovered that other possible types of belts, including those of round cross section and of triangular or V-shaped cross section, due to a complex set of factors, also introduce undesirable speed variations and irregularities which are unacceptable for data processing applications. On the other hand the flat belt disclosed herein provides very good results, and in fact will tend to damp out or filter inherent pulsations present in the drive at the motor itself, caused by the number of poles in the motor, their nature and arrangement, and by other factors.

Finally, regardless of the specific application of the present drive mechanism, the absolute certainty of the driving engagement which it provides between the motor output shaft, the roller elements and the spindle drive drums is a matter of considerable importance, and one which should not be overlooked. That is, the torque transmitted through the engaged roller element exerts a force on that roller which tends to further engage it between the output shaft and the spindle drive drum, in a positive wedging manner. This wedging action increases the force vector disposed normal to the points of tangency between the roller element and output shaft on the one hand and the roller and drive drum on the other hand. Since the frictional force of engagement increases with such increased force vector, the maximum torque that the drive train can transmit is correspondingly increased. This characteristic of the invention is clearly of considerable importance, and it is in large part because of this that slippage in the system if absolutely precluded at any and all anticipated conditions of operation.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

The embodiments of the invention in which an exclusive property or privilege is claimed are defined as follows.

I claim:

1. A drive train apparatus for tape recorder devices and the like, comprising in combination: a reversible motor means having a bidirectional output shaft; a pair of spaced drive spindles for tape reels and the like, one of said spindles for driving operation in a first rotary direction and the other for driving operation in a second direction opposite the first; and a drive transfer means effectively coupling said one spindle to said output shaft upon rotation of the latter in a first of its two directions and effectively coupling said other spindle to said shaft upon rotation thereof in the other of such two directions; said motor means comprising a reversible motor having its own output shaft, a drive drum means having its own output shaft, and a drive belt between said motor shaft and said drum means, said drum output shaft comprising the output shaft of said motor means.

2. The apparatus of claim 1, wherein said belt is flat and generally smooth.

3. The drive train apparatus of claim 1, wherein said drive transfer means comprises at least one idler roller and means for moving the same into and out of effective driving engagement between said motor means output shaft and said spindles.

4. The apparatus of claim 3, wherein said idler roller is mounted in continuous rotational engagement with said motor means output shaft and moved into and out of effective driving engagement with said spindles.

5. The apparatus of claim 4, including a support means for said idler roller, said support means being pivotal about the axis of said motor means output shaft.

6. The apparatus of claim 1, wherein said drive transfer means comprises a pair of idler rollers and means for moving one such roller into effective driving engagement between said motor means output shaft and one of said spindles while moving the other such roller out of such engagement between such shaft and the other of said spindles.

7. The apparatus of claim 6, wherein both of said idler rollers are mounted in continuous rotational engagement with said motor means output shaft and moved into and out of effective driving engagement with said spindles.

8. The apparatus of claim 7, including a support means for said idler rollers, said support means being pivotal about the axis of said motor means output shaft.

9. The apparatus of claim 8, including means for pivoting said support means about the said axis of said motor means output shaft by creating at least a slight drag force between such shaft and said support means causing the latter to follow said shaft.

10. A drive train apparatus for tape recorder devices and the like, comprising in combination: a reversible motor means having a bidirectional output shaft; a pair of spaced drive spindles for tape reels and the like, one of said spindles for driving operation in a first rotary direction and the other for driving operation in a second direction opposite the first; a drive transfer means effectively coupling said one spindle to said output shaft upon rotation of the latter in a first of its two directions and effectively coupling said other spindle to said shaft upon rotation thereof in the other of such two directions; said drive transfer means comprising at least one idler roller and means for moving such roller into effective driving engagement between said motor means output shaft and one of said spindles while moving such roller out of such engagement between such shaft and the other of said spindles; and a support means for said idler roller, said support means being pivotal about the axis of said motor means output shaft; said support means including a bracket member having a pair of spaced leg portions, said bracket mounted on said motor means output shaft such that said leg portions angularly intersect the axis of such shaft, said leg portions mounting said roller in rotational contact with said output shaft.

11. The apparatus of claim 10, wherein said rollers are of a material which is at least slightly resilient, and said output shaft has a roughened surface extending over at least part of the area wherein such shaft contacts said rollers.